Jan. 28, 1930.   H. C. BEAMES   1,744,733
MEANS FOR EXTINGUISHING FIRES ON MOTOR VEHICLES
Filed Sept. 22, 1927   2 Sheets-Sheet 1
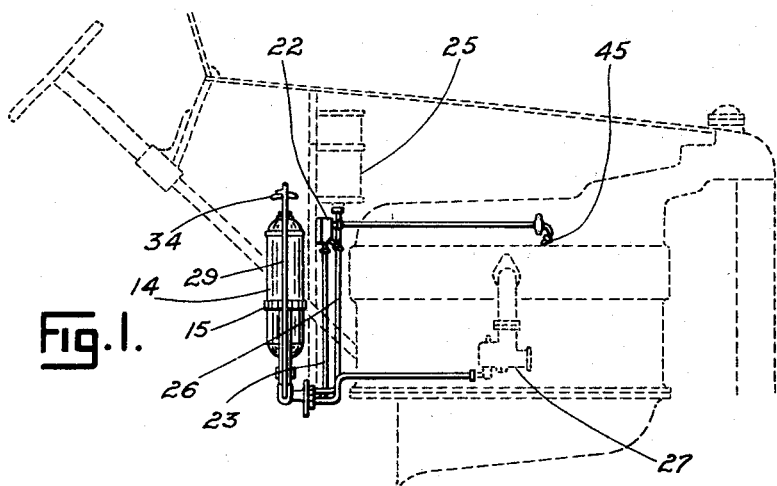
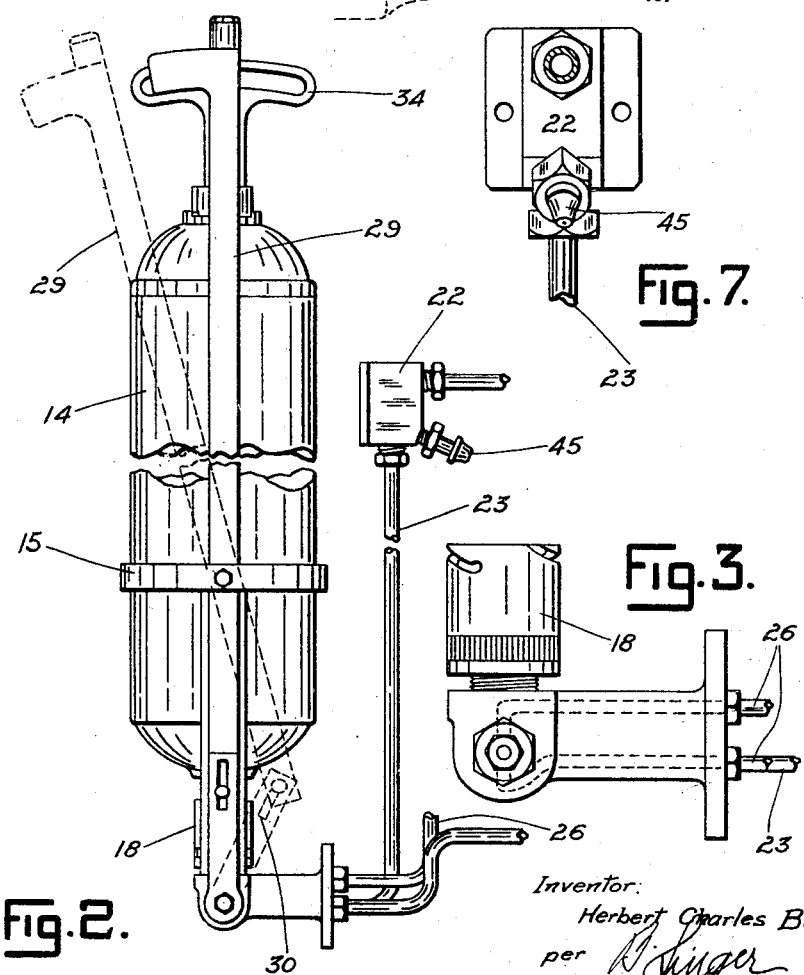
Inventor:
Herbert Charles Beames
per D. Singer
Attorney.

Jan. 28, 1930.  H. C. BEAMES  1,744,733
MEANS FOR EXTINGUISHING FIRES ON MOTOR VEHICLES
Filed Sept. 22, 1927   2 Sheets-Sheet 2
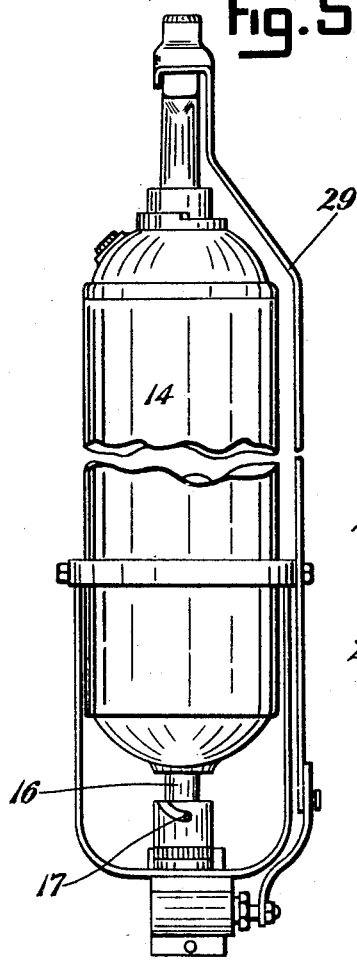
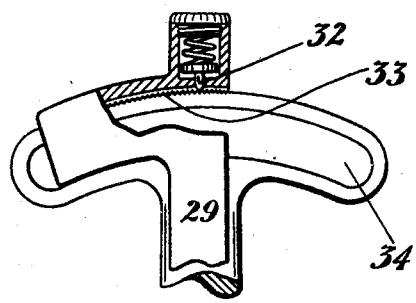
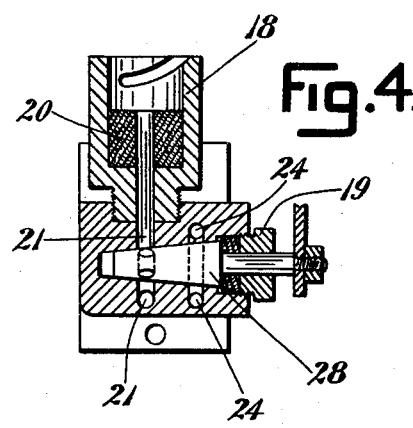
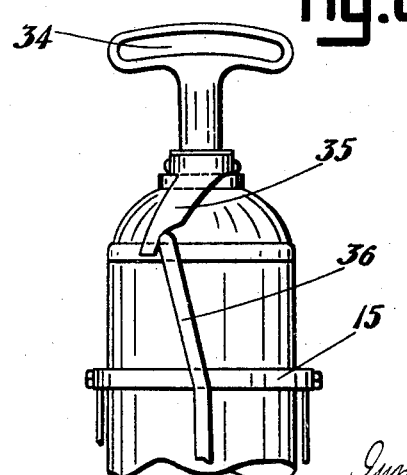
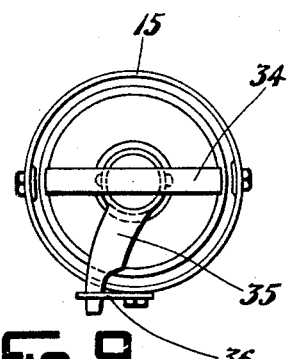

Patented Jan. 28, 1930

1,744,733

UNITED STATES PATENT OFFICE

HERBERT CHARLES BEAMES, OF NEWCASTLE, NEW SOUTH WALES, AUSTRALIA

MEANS FOR EXTINGUISHING FIRES ON MOTOR VEHICLES

Application filed September 22, 1927. Serial No. 221,304.

This invention relates to means under the immediate control of the driver whereby should a fire occur under the bonnet of a motor vehicle it may be attacked without raising the bonnet while at the same time if desired the petrol supply to the carburettor may be cut off automatically or otherwise.

According to one form of the invention I mount on the dash board or in any other convenient position a suitable fire extinguishing appliance, preferably one of the reciprocating pump type. This appliance may be pivoted to or otherwise connected at its delivery end, to a system of spray nozzles pipes or sprinklers within the bonnet of the vehicle or the discharge pipe from the extinguisher may pass through the dash or other board and be connected to a system of nozzles pipes or sprinklers adjacent to the engine. The said discharge pipe may be provided with one or more branch or sparge pipes adapted to spray the extinguishing liquid or gas on one or more sides of the carburettor and the engine. A control lever may be provided to automatically shut off the flow of liquid fuel to the carburettor and open communication between the extinguisher and the discharge pipe or I may provide a tap or cock on the pipe leading thereto normally held in the open position by a combustible cord, spring or the like connection so that it may be closed by a spring on said combustible connection being burned through.

But in order that the invention may be more readily understood, reference will now be made to the accompanying drawings wherein:—

Figure 1 is an elevational view showing the invention mounted in a suitable position to attack a fire under the bonnet of a motor vehicle.

Figure 2 is an enlarged view of a chemical extinguisher apparatus showing its attachment to the distributing valve.

Figure 3 is a side elevation of the socket and plug valve connection.

Figure 4 is a sectional elevation of the socket and plug valve connection taken at right angles to Figure 3.

Figure 5 is an elevation taken at right angles to Figure 2 showing the chemical extinguishing apparatus with its locking arm in its normal or locking position.

Figure 6 is a detail view showing the retaining means for the locking arm.

Figure 7 is a detail view of a junction box for the spray pipes and nozzles.

Figure 8 is a part elevational view of the extinguisher showing a modified locking petrol control lever.

Figure 9 is a plan thereof.

The chemical extinguisher cylinder 14 is mounted in a case or other support 15 disposed adjacent the dash board of the motor vehicle and has at its lower end a nozzle 16 fitted with two pins or projections 17 adapted to engage a bayonet or like socket 18 which is screwed or otherwise connected to a valve casing 19. The socket is fitted with suitable packing 20 or other resilient means and communicates with the valve casing.

The valve casing 19 has ports and passages 21 adapted to connect the extinguisher cylinder 14 with a junction box 22 inside the bonnet by means of pipe 23 from which the extinguishing fluid is directed to be sprayed upon the various parts of the engine and carburettor.

The valve casing 19 has also ports and passages 24 adapted to connect the vacuum tank 25 or the fuel supply pipes 26 with the carburettor 27.

A plug valve 28 is mounted in the valve casing 19 and is provided to normally connect the fuel supply from the vacuum tank 25 to the carburettor 27 but on the operation of the control lever 29 is adapted to close the fuel supply and open the fluid supply through ports and passages 21.

The control lever 29 is pivoted to the cage 15 and has a slotted connection 30 to give greater movement to the operating lever 31 of the plug valve. The control lever if desired may be mounted directly on the plug stem. The upper end of the control lever 29 has a spring pressed pin or a ball 32 adapted to engage teeth 33 or orifices on the pump handle 34 of the extinguisher 14 and by this means is held against accidental displacement.

In the modification shown in Figures 8 and 9 the pump handle 34 is coupled by a slotted lever 35 to a control lever 36 adapted to close the petrol supply before the pump handle can be reciprocated to force the fluid to the spray pipes in a similar manner to that described and illustrated with reference to Figure 2.

When a fire occurs the control lever 29 figures 2, 5, and 6 is pulled outwards to release the pump handle 34. This has the effect of immediately closing the petrol supply to the carburettor and opening communication between the extinguisher cylinder 14 and the spray nozzles 45. On using the pump handle 34 of the extinguisher the fluid therein is forced to the nozzles 45 and is sprayed around the engine and carburettor without having to raise the bonnet.

I claim:

1. Apparatus for extinguishing fires under the bonnet of a motor vehicle, comprising, in combination with a carburettor, a control valve for the fuel supply to the carburettor, a chemical fire extinguishing apparatus having a discharge nozzle in communication therewith controlled by said valve, the latter being so arranged and constructed as to cut off the supply of fuel to the carburettor when permitting the discharge of liquid from the fire extinguishing apparatus through said nozzle and a socket which supports the fire extinguishing apparatus and is provided with a passage for liquid to the control valve.

2. Apparatus as claimed in claim 1, including also a lever for operating the control valve, and means to prevent casual movement thereof.

In testimony whereof I have hereunto set my hand.

HERBERT CHARLES BEAMES.